Nov. 1, 1949.   J. W. MOORE   2,486,430
MOTOR BIKE FRAME
Filed April 22, 1947   2 Sheets-Sheet 1
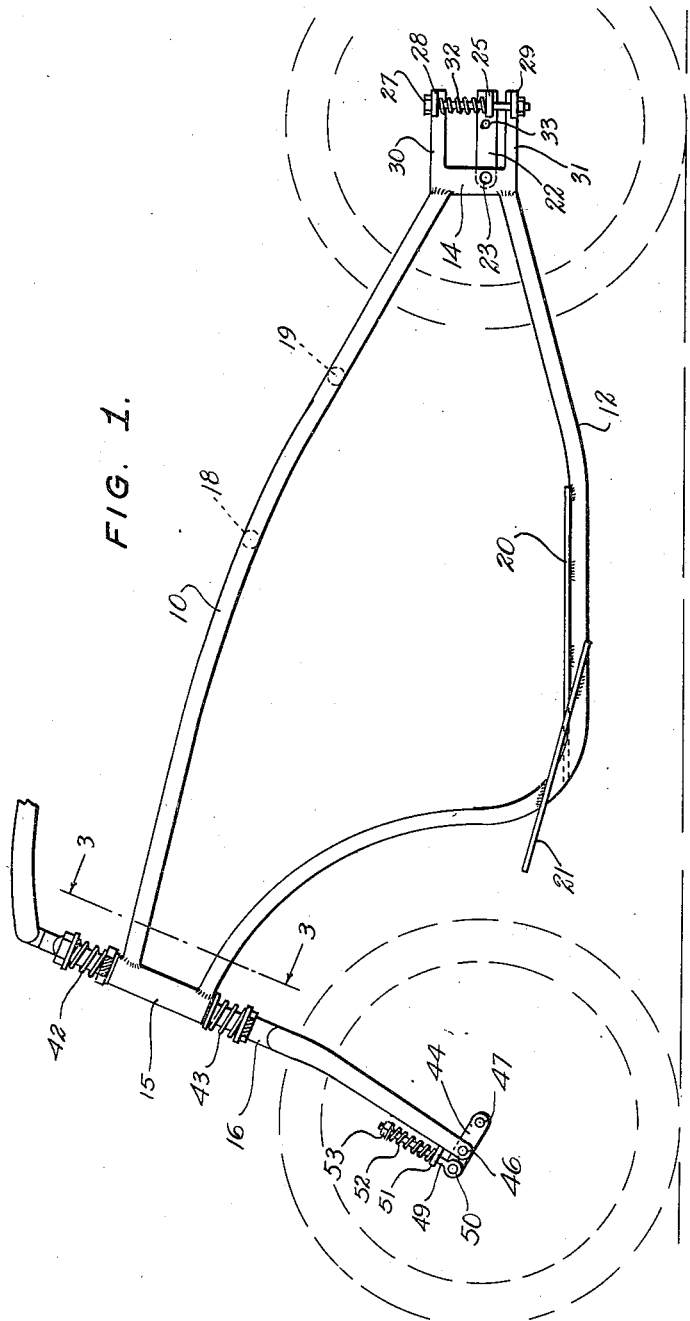
Inventor
JOHN W. MOORE,

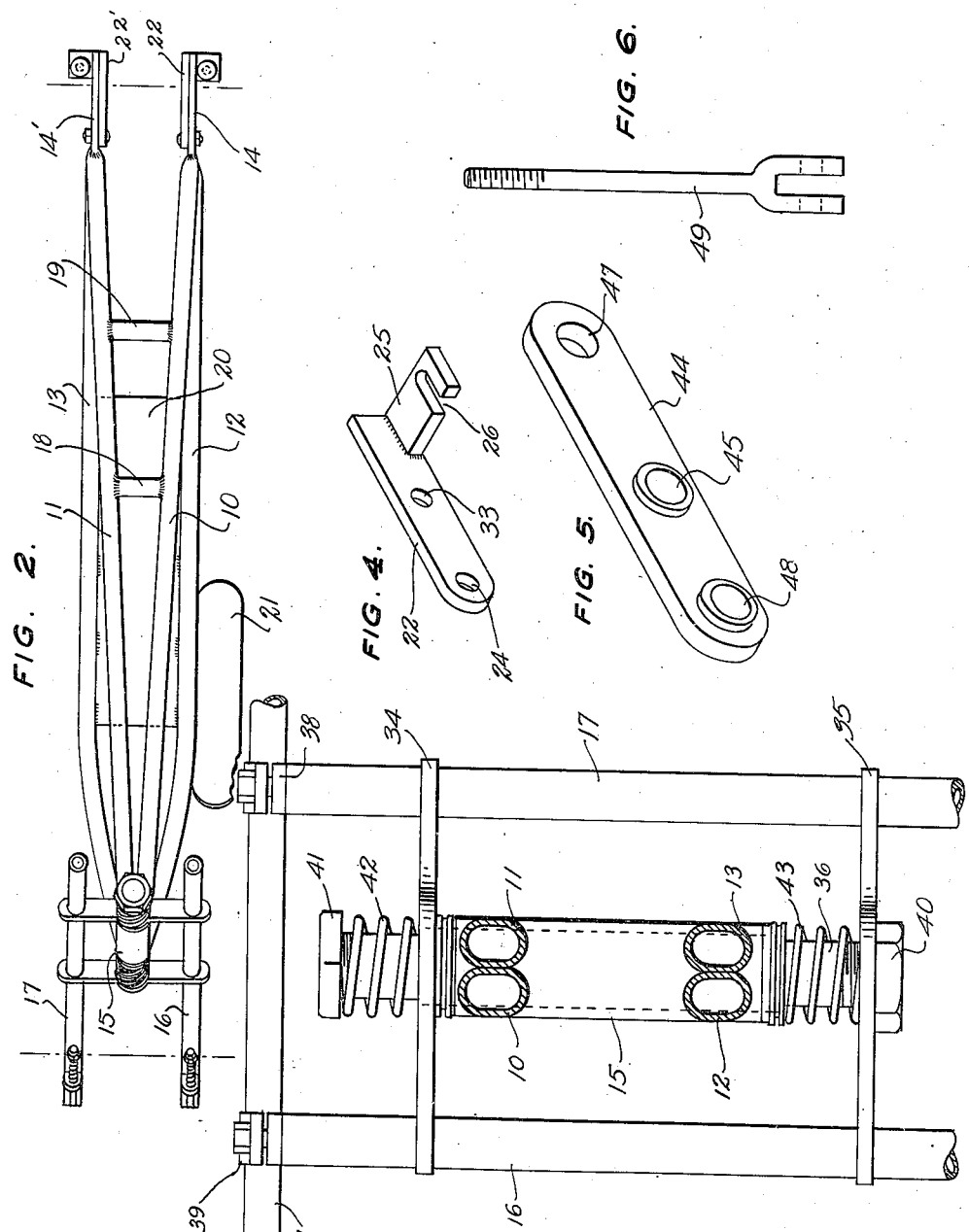

Patented Nov. 1, 1949

2,486,430

UNITED STATES PATENT OFFICE 2,486,430

MOTOR BIKE FRAME

John W. Moore, Wichita, Kans.

Application April 22, 1947, Serial No. 742,998

4 Claims. (Cl. 280—286)

This invention relates to frames for motor-bikes of the two wheel type, and in particular a comparatively simple light weight frame having resilient wheel mountings and a resilient floating connection between the head and front wheel yoke spindle.

The purpose of this invention is to provide a simple light weight frame for motor-bikes which at the same time provides easy riding and thereby reduces shock to the operating instrumentalities thereof.

The usual motorcycle is comparatively heavy and because of the weight it is easy riding and shock to the operating parts is substantially eliminated, and when the weight is reduced and a comparatively light frame used the usual shock absorbing elements are eliminated. With this thought in mind this invention contemplates a motor-bike frame with springs in the wheel mountings and also springs in the head resiliently holding the head in floating relation in reference to the front wheel yoke spindle.

The object of the invention is to provide means for incorporating springs and the like in a relatively light weight motor-bike frame to compensate for the reduced weight in order to provide easy riding thereof.

Another object of the invention is to provide a frame for motor-bikes that can be turned on a comparatively short radius.

Another object of the invention is to provide means in a frame for motor-bikes which eliminates or at least reduces damage to the machine parts due to road shocks.

A further object of the invention is to provide an easy riding, simple, light weight frame for motor-bikes and the like which is of a simple and economical construction.

With these and other objects in view the invention embodies a yoke-like frame having double tubular saddle and motor mounting bars with rear wheel axle mounting bars pivotally mounted in yokes at the rear ends, springs holding the outer ends of the mounting bars, a front wheel fork with pivotally mounted bars with the ends held by springs in the lower ends thereof, and springs on a spindle of the front wheel fork at opposite ends of the head of the frame.

Other features and advantages of the invention will appear from the following description taken in connection with the drawings, wherein:

Figure 1 is a view showing a side elevation of the frame with the wheels indicated in dotted lines, the motor and other parts omitted, and with the handle bars broken away.

Figure 2 is a plan view of the frame.

Figure 3 is a detail showing a section through the forward part of the frame taken on line 3—3 of Figure 1.

Figure 4 is a detail showing one of the plates for mounting the rear wheel in the frame.

Figure 5 is a view showing one of the front wheel mounting plates.

Figure 6 is a view showing one of the front wheel spring bolts.

Referring now to the drawings wherein like reference characters indicate corresponding parts the motor bike frame of this invention includes upper saddle support holding bars 10 and 11, lower motor supporting bars 12 and 13, rear wheel yokes 14 and 14', a head 15, and a front wheel fork formed with the bars 16 and 17.

The bars 10 and 11 extend backward from the head 15 spreading slightly as shown in Figure 2 and intermediate of the length thereof they are joined by struts 18 and 19. The rear ends of the bars 10 and 11 are joined to the upper ends of the rear wheel yokes 14 and the lower ends of the yokes are attached to the rear ends of the bars 12 and 13 which also extend backward from the head and are spread slightly. The lower bars 12 and 13 carry a base plate 20 and also a foot rest 21.

Horizontally disposed bars 22 and 22' are pivotally mounted, at one end in the yokes 14, on bolts 23 through openings 24 and on the outer ends of the bars are outwardly extending plates 25 having open sockets 26 therein which are positioned around bolts 27. The bolts 27 are vertically supported in lugs 28 and 29 at the outer ends of the horizontal arms 30 and 31 of the yokes 14 and springs 32 are provided around the bolts between the lugs 28 and plates 25 which resiliently hold the bars 22 downward as shown. The bars 22 are provided with openings 33 in which the axle of the rear wheel is mounted.

The side bars 16 and 17 of the front wheel yoke are mounted in plates 34 and 35 between which the head 15 is slidably held on a spindle 36 and the handle bar 37 is held in the upper ends of the bars by clamps 38 and 39. The lower end of the spindle is secured in the bar 35 by a lock nut 40 and the upper end is provided with a nut 41 through which the upper end of the spindle is resiliently held by a spring 42. Another spring 43 is provided around the lower end of the spindle below the lower end of the head 15 and plate 35 thereby holding the head in floating relation to the fork and suspended between the springs.

In the lower ends of the side bars 16 and 17 of the front wheel fork are bars 44 having intermediate sockets 45 therein through which they are pivotally mounted in the fork on pins 46, and in the inner ends of the bars 44 are bearing sockets 47 in which the axle of the front wheel is mounted. The outer ends of the bars 44 are pivotally held through openings 48 in the lower ends of bolts 49 by bolts 50, and the bolts 49 are freely held in projections 51 on the bars 16 and 17 and resiliently held upward by springs 52 between the projections 51 and nuts 53 on the upper ends of the bolts.

With a frame of this design and with the bars formed of relatively light weight tubes the frame will have rigidity and at the same time will be comparatively light wherein the motor bike will be adapted for use by young people. The frame provides a foundation and the usual wheels, saddle, controls, and a motor may be mounted thereon.

It will be understood that the frame may be provided in different designs and may be of any suitable size, and also that other modifications may be made in the parts without departing from the spirit of the invention.

What is claimed is:

1. A bicycle frame comprising an upper bar member comprising a pair of laterally spaced bars, a lower bar member comprising a pair of laterally spaced bars, a tubular frame head having said upper and lower bar members fixed thereto at vertically spaced points, a front wheel fork comprising a pair of vertical laterally spaced elements having front wheel mounting means on their lower ends, upper and lower horizontal cross bars spacing and connecting said vertical elements, said tubular frame head being positioned between said vertical elements with said cross bars spaced above and below said tubular frame head, a spindle rotatably and slidably extending through said tubular frame head, opposite end portions of said spindle vertically slidably traversing said upper and lower cross bars, enlargements on the upper and lower ends of said spindle located above and below said upper and lower cross bars, respectively, first expanding spring means compressed between said upper cross bar and the upper spindle enlargement, and second expanding spring means compressed between the lower end of said tubular frame head and the lower cross bar.

2. A bicycle frame comprising an upper bar member comprising a pair of laterally spaced bars, a lower bar member comprising a pair of laterally spaced bars, a tubular frame head having said upper and lower bar members fixed thereto at vertically spaced points, a front wheel fork comprising a pair of vertical laterally spaced elements having front wheel mounting means on their lower ends, upper and lower horizontal cross bars spacing and connecting said vertical elements, said tubular frame head being positioned between said vertical elements with said cross bars spaced above and below said tubular frame head, a spindle rotatably and slidably extending through said tubular frame head, opposite end portions of said spindle vertically slidably traversing said upper and lower cross bars, enlargements on the upper and lower ends of said spindle located above and below said upper cross bars, respectively, first expanding spring means compressed between said upper cross bar and the upper spindle enlargement, and second expanding spring means compressed between the lower end of said tubular frame head and the lower cross bar, said front wheel mounting means comprising shock absorbing means.

3. A bicycle frame comprising an upper bar member comprising a pair of laterally spaced bars, a lower bar member comprising a pair of laterally spaced bars, a tubular frame head having said upper and lower bar members fixed thereto at vertically spaced points, a front wheel fork comprising a pair of vertical laterally spaced elements having front wheel mounting means on their lower ends, upper and lower horizontal cross bars spacing and connecting said vertical elements, said tubular frame head being positioned between said vertical elements with said cross bars spaced above and below said tubular frame head, a spindle rotatably and slidably extending through said tubular frame head, opposite end portions of said spindle vertically slidably traversing said upper and lower cross bars, enlargements on the upper and lower ends of said spindle located above and below said upper and lower cross bars, respectively, first expanding spring means compressed between said upper cross bar and the upper spindle enlargement, and second expanding spring means compressed between the lower end of said tubular frame head and the lower cross bar, the rear ends of said upper and lower bar members being vertically aligned, brackets connected to the rear ends of vertically aligned bars, and shock absorbing rear wheel mounting means connecting said brackets in laterally spaced relation.

4. A bicycle frame comprising an upper bar member comprising a pair of laterally spaced bars, a lower bar member comprising a pair of laterally spaced bars, a tubular frame head having said upper and lower bar members fixed thereto at vertically spaced points, a front wheel fork comprising a pair of vertical laterally spaced elements having front wheel mounting means on their lower ends, upper and lower horizontal cross bars spacing and connecting said vertical elements, said tubular frame head being positioned between said vertical elements with said cross bars spaced above and below said tubular frame head, a spindle rotatably and slidably extending through said tubular frame head, opposite end portions of said spindle vertically slidably traversing said upper and lower cross bars, enlargements on the upper and lower ends of said spindle located above and below said upper and lower cross bars, respectively first expanding spring means compressed between said upper cross bar and the upper spindle enlargement, and second expanding spring means compressed between the lower end of said tubular frame head and the lower cross bar, said front wheel mounting means comprising shock absorbing means, the rear ends of said upper and lower bar members being vertically aligned, brackets connected to the rear ends of the vertically aligned bars, and shock absorbing rear wheel mounting means connecting said brackets in laterally spaced relation.

JOHN W. MOORE.

REFERENCES CITED

The following references are of record in the file of this patent:

UNITED STATES PATENTS

| Number | Name | Date |
|---|---|---|
| 389,200 | Clegg | Sept. 11, 1888 |
| 447,234 | Donnelly | Feb. 24, 1891 |
| 1,535,435 | Neracher | Apr. 28, 1925 |
| 1,865,896 | Gillet | July 5, 1932 |
| 2,038,011 | Spiegler et al. | Apr. 21, 1936 |

FOREIGN PATENTS

| Number | Country | Date |
|---|---|---|
| 245,580 | Italy | Mar. 2, 1926 |
| 622,007 | Germany | Nov. 18, 1935 |